(12) United States Patent
Gros D'Aillon et al.

(10) Patent No.: US 9,835,497 B2
(45) Date of Patent: Dec. 5, 2017

(54) ROD THERMOMETER DEVICE FOR DETECTING A TEMPERATURE, USE FOR THE ELECTRICAL SIMULATION OF NUCLEAR FUEL RODS

(71) Applicant: COMMISSARIAT À L'ENERGIE ATOMIQUE ET AUX ENERGIES ALTERNATIVES, Paris (FR)

(72) Inventors: Luc Gros D'Aillon, Brie et Angonnes (FR); Coraline Neiss, Grenoble (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 293 days.

(21) Appl. No.: 14/436,508

(22) PCT Filed: Oct. 16, 2013

(86) PCT No.: PCT/IB2013/059395
§ 371 (c)(1),
(2) Date: Apr. 17, 2015

(87) PCT Pub. No.: WO2014/060966
PCT Pub. Date: Apr. 24, 2014

(65) Prior Publication Data
US 2015/0323390 A1 Nov. 12, 2015

(30) Foreign Application Priority Data
Oct. 17, 2012 (FR) .................................... 12 59890

(51) Int. Cl.
*G01K 7/00* (2006.01)
*G01K 1/02* (2006.01)
(Continued)

(52) U.S. Cl.
CPC .............. *G01K 1/026* (2013.01); *B23K 9/007* (2013.01); *B23K 9/0035* (2013.01); *G01K 7/06* (2013.01);
(Continued)

(58) Field of Classification Search
None
See application file for complete search history.

(56) References Cited

U.S. PATENT DOCUMENTS 4,326,122 A 4/1982 McCulloch et al.
4,659,898 A * 4/1987 Spiegelman ......... B23K 11/002
219/117.1

(Continued)

FOREIGN PATENT DOCUMENTS

| EP | 0 762 432 A1 | 3/1997 |
| FR | 2 975 527 A1 | 11/2012 |
| GB | 1059860 | 2/1967 |

OTHER PUBLICATIONS

Written Opinion issued in French Application No. 771961.
Jun. 23, 2014 International Search Report issued in International Application No. PCT/IB2013/059395.

*Primary Examiner* — Erica Lin
(74) *Attorney, Agent, or Firm* — Oliff PLC (57) ABSTRACT

The invention relates to rod thermometer device for detecting a temperature, including a plurality of temperature-sensitive elements and a protective sheath having an axis X in which the sensitive elements are partially inserted. The sheath is made of a metal constituting one of the two metals of a thermocouple, and the sensitive elements of a plurality of wires made of a metal other than that of the sheath and constituting the other one of the two metals of a thermocouple, one of the ends of each one of the wires being welded inside the sheath forming a junction for measuring a given thermocouple, the welded ends of the wires being (Continued)

distributed along a plurality of axial and azimuth positions relative to the axis X inside the sheath, each one of the wires extending out of the sheath by at least one of the ends thereof.

16 Claims, 3 Drawing Sheets

(51) Int. Cl.
    *B23K 9/00*     (2006.01)
    *B23K 9/007*     (2006.01)
    *G01K 7/06*     (2006.01)
    *G21C 17/112*     (2006.01)

(52) U.S. Cl.
    CPC ....... G21C 17/112 (2013.01); *Y10T 29/49119* (2015.01)

(56) References Cited

U.S. PATENT DOCUMENTS

| | | | |
|---|---|---|---|
| 5,712,886 A | 1/1998 | Baldy | |
| 2012/0006097 A1* | 1/2012 | Henson | G01N 27/411 73/25.01 |
| 2013/0083883 A1* | 4/2013 | Morris | G01F 23/22 376/247 |
| 2014/0151363 A1 | 6/2014 | Gros D'Aillon et al. | |

\* cited by examiner

ROD THERMOMETER DEVICE FOR DETECTING A TEMPERATURE, USE FOR THE ELECTRICAL SIMULATION OF NUCLEAR FUEL RODS

TECHNICAL FIELD

The present invention relates to a novel temperature detecting device forming a multipoint rod thermometer designed to detect temperatures at various points.

The main application of the invention is to the detection of the occurrence of boiling crises by means of a device for electrically simulating nuclear fuel rods intended to be assembled into assemblies using spacer grids and intended to be used in what are referred to as power reactors and more particularly pressurized water reactors (PWRs).

Implementation of such a device allows nuclear fuel rods to be qualified thermo-hydraulically, and in particular allows the occurrence of boiling crises in the liquid in which they are intended to be submerged to be detected under conditions that are representative of an actual nuclear reactor. The occurrence and location of a boiling crisis must be detected in electrical simulating devices with response times that would allow safety systems to be activated.

Generally, the invention aims to detect, using one and the same device, temperatures at various points distributed in a plurality of axial and azimuthal positions and in particular distributed with a high spatial density.

Although described with reference to the main application, the temperature detecting device according to the invention may be used to detect various temperatures or temperature gradients at various points on a given wall to be monitored, the temperatures at each point being detected by radiated heat.

PRIOR ART

To qualify a nuclear fuel rod assembly intended to be used in a pressurized water nuclear reactor (PWR), it is necessary to carry out boiling crisis tests. More precisely, it is necessary to be able to detect the occurrence and location of boiling crises. Specifically, a boiling crisis may generally be defined as a substantial change in wall temperature for a small variation in thermo-hydraulic control parameters. A boiling crisis manifests itself by an abrupt degradation in the heat exchange between a heated wall and the coolant that surrounds it, i.e. an abrupt increase in wall temperature. Thus, in a PWR reactor, the occurrence of this effect could cause the cladding of a nuclear fuel rod to rupture.

In other words, nuclear fuel rod assemblies must be qualified with respect to boiling crises in order to allow operating tolerances to be evaluated for the operating conditions encountered during nominal operation, incidents or control transients, and the risk of damaging rod claddings, which are the first containment barrier of the fuel, to be limited.

This qualification consists in defining experimentally the occurrence and location of a boiling crisis by means of devices for electrically simulating nuclear fuel rods generating high heat flux densities. Implementation of a simulating device consists in submerging the device in an almost uninterrupted flow of liquid and slowly varying a single thermo-hydraulic parameter, while the other parameters are adjusted to preset constant values, until a boiling crisis is obtained.

As regards devices used to simulate electrically nuclear fuel rods generating high heat flux densities, most of those used are what are referred to as direct heating devices because the cladding of the device, which makes contact with the heated water, also constitutes the resistive heating element. In other words, the cladding is directly heated.

The Applicant has also proposed, in patent application FR 11 54336, filed 18 May 2011, an electrical simulating device employing indirect heating, which especially allows nuclear fuel assemblies intended to be submerged in an electrically conductive coolant to be qualified, such as is the case for the generation IV fast breeder reactors (FBRs) that used sodium as a coolant (Na-FBRs), which will require high heat flux density sodium boiling tests to be carried out.

Whatever the type of electrical simulating device, the detection of the occurrence of a boiling crisis and its location requires a high spatial measurement density and, for safety reasons, very short response times, access constraints being very tight because the devices are made up of tubes of small diameter. In particular, a high spatial measurement density is required because of the high thermal flux density that, in general, has a nonuniform axial profile, due to neutron transport. The grids are of shape, size and axial positions identical to those of a assembly in a reactor.

Up to now in practice, in simulating devices employing direct heating, thermocouples cladded with steel or another analogous material are welded directly to the heated cladding at points to be monitored, i.e. in zones where boiling crises are expected. This technique has many drawbacks which may be enumerated as follows:

it substantially limits the number of measurement points due to the very limited space available for thermocouples in the device;

it may cause local disruption of the heating current in the cladding and therefore of the heat flux density and thus of the boiling effects observed;

it is relatively expensive in terms of investment and in terms of the man-hours required to form the measurement points, more particularly in the case of a large number of tests; and with this technique it is impossible to recover the measurement instrumentation and the heated claddings.

In the simulating device employing indirect heating of the aforementioned patent application FR 11 54336, the Applicant proposes to insert each of a plurality of thermocouples into a groove produced on the outside periphery of an unheated cladding making direct contact with the liquid to be heated, with the attendant advantage of allowing the thermocouples to be positioned with a high precision. Nonetheless, the number of measurement points remains limited, the cost of forming the measurement points remains high and it is again not possible with this technique to recover the measurement instrumentation and the instrumented claddings.

Moreover temperature detecting devices, commonly called multipoint rod thermometers/pyrometers, that comprise elements sensitive to temperature, such as resistance thermometers, thermoelectric couples or thermistors, housed in a protective cladding, are known. These rod thermometers have the advantage of being able to be implanted in situ, of not physically impacting the one or more walls of the object on which temperature is detected and of being recoverable after the temperature measurements. This being so, currently available rod thermometers do not allow a very high spatial measurement density to be obtained, are relatively expensive and cannot actually be implanted in zones in which the available space, or in other words access, is very restricted.

There is therefore a need to improve existing temperature detecting devices and techniques, especially with a view to obtaining a higher spatial measurement density, even in zones where available access space is very restricted, with a view to decreasing the cost of instrumentation for measuring walls to be monitored, and with a view to making it possible to recover and reuse all the components of the measurement instrumentation and the monitored walls, such as the heated or unheated claddings of devices for electrically simulating nuclear fuel rods.

The general aim of the invention is therefore to provide a novel temperature detecting device that meets this need at least partially.

One particular aim of the invention is to provide a temperature detecting device that is able to be used in a device for electrically simulating a nuclear fuel rod.

SUMMARY OF THE INVENTION

To do this, the subject of the invention, according to one of its aspects, is a device for detecting temperature, forming a rod thermometer, comprising:

a plurality of elements sensitive to temperature; and a protective cladding of longitudinal axis X in which the sensitive elements are partially housed, characterized in that the cladding is made of a metal constituting one of the two metals of a thermocouple, and in that the sensitive elements consist in a plurality of wires made of a metal different from that of the cladding and constituting the other of the two metals of a thermocouple, one of the ends of each of the wires being welded to the interior of the cladding so as to form a measurement junction of a given thermocouple, the welded ends of the wires being distributed in a plurality of axial and azimuthal positions relative to the axis X in the interior of the cladding, each of the wires exiting from the cladding via at least one of its ends.

In other words, the invention consists in giving a cladding of a rod thermometer, which in the prior art only had the function of protecting the sensitive elements, another function, namely the function of a metal common to a plurality of thermocouples, the other metal of each of the thermocouples being that of a wire welded directly to the cladding, the wires being distributed in a plurality of axial and azimuthal positions.

In yet other words, according to the invention, the metal of the cladding is used as one of the two metals of a thermocouple and as a metal common to all the thermocouples; a wall temperature is detected by radiated heat at a point set by a single wire made of the other metal of the thermocouple.

By virtue of the invention, it is possible to detect temperatures in as many as several hundred zones per object to be monitored, such an object possibly being an electrical simulator of nuclear fuel rods, while keeping the cost of the measurement instrumentation relatively low. The rod thermometer according to the invention is, moreover, independent of the object to be monitored, it and the objects to be monitored, such objects possibly being the heated claddings of electrical simulating devices, may therefore be reused many times.

In other words, the rod thermometer according to the invention has many advantages relative to the detection techniques of the prior art:

it increases the number of temperature detection points, typically to several per linear centimeter;

the thermocouples do not disrupt the heat flux density locally;

the cost of the measurement instrumentation is substantially decreased;

the rod thermometer and objects to be monitored, such objects possibly being heated claddings, are easy to recover; and the rod thermometer according to the invention may be adapted to detect temperatures under a wide range of environmental conditions, because of the very high spatial density of the detection points.

Preferably, the metal of the cladding is a type-K material.

Again preferably, the metal of the wires is a type-K material.

Thus, according to one preferred variant embodiment, the cladding is either made of chromel or of a nickel/chromium alloy such as Inconel® 600, and the wires are made of alumel. Such type-K thermocouples have the advantage of being able to measure a wide range of temperatures and of being inexpensive.

According to one advantageous feature, the wires are covered with an electrical insulator apart from their junction ends. Thus, each thermocouple is electrically insulated from the others and from the cladding. According to one preferred variant embodiment, the alumel wires are covered with an alumina deposit.

Preferably, the thickness of the cladding is smaller than or equal to 0.1 mm.

Again preferably, the outside diameter of the wires is smaller than or equal to 0.1 mm. With these dimensions, the thermal inertia of a measurement point at the junction between a wire and the cladding is relatively small, thereby ensuring a relatively short response time. It is thus possible to detect the occurrence of a boiling crisis very rapidly. Typically, in an electrical simulation device employing direct heating, for a heated cladding temperature of below 750° C., and for an increase in the temperature of the latter of about 1000° C. per second, the inventors believe that it is possible, by virtue of the rod thermometer according to the invention, to detect deviations in temperature above the required detection threshold, typically more than 10° C., in a time shorter than 100 ms. A boiling crisis in a device for electrically simulating a nuclear fuel rod is thus detected as soon as the temperature variation exceeds the set threshold, which is at least equal to 10° C.

According to one advantageous feature, the rod thermometer comprises at least one adapter-tube made from the same metal as the cladding and of larger outside diameter than that of the cladding, the adapter-tube being brazed around the cladding at the end where the metal wires exit. This makes it easier to fit the rod thermometer in a heated cladding.

Another subject of the invention, according to another of its aspects, is a process for manufacturing the rod thermometer described above, comprising the following steps:

cutting longitudinally along two opposite generatrices a tube made of a metal constituting one of the two metals of a thermocouple, so as to form two half tubes;

welding one end of each of the plurality of wires made of a metal constituting one of the two metals of a thermocouple to the interior of at least one half tube, the ends of the welded wires being distributed in a plurality of axial and azimuthal positions; and reconstituting the metal tube forming the cladding by welding along each generatrix while leaving the plurality of metal wires to exit via at least one of its ends.

Such a manufacturing process is simple to implement especially because the interior of the half tubes is easy to access. Each metal wire may also easily be unwound from conventional reels holding about one hundred meters of wire.

Preferably, the welding of one of the ends of the wires to at least one half tube is achieved by arc welding.

Again preferably, the reconstituting welding is spot welding. These well-characterized welding techniques allow very precise measurement junctions to be produced.

The invention also relates, according to another aspect, to a method for installing the temperature detecting device described above in a device for simulating electrically a nuclear fuel rod comprising at least one tube made of an electrically conductive material, referred to as the heated tube, that is intended to heat a liquid, in order to detect the occurrence of a boiling crisis in the liquid, in which, the cladding forming the common metal of the thermocouples is arranged in the interior of the electrical simulating device and at a distance from the heated tube, the space between the cladding and the heated tube is filled with a pressurized insulating gas and the space filled with pressurized insulating gas is sealed.

According to one advantageous variant embodiment, in order to avoid the risk of short circuits, the arrangement at distance is achieved by means of spacers made of an electrically insulating material, such as ceramic spacers, that are fastened to the exterior of the cladding housing the welded wires and fitted so that there is play with the interior of the heated tube, in zones devoid of wires. The play between the spacers and the interior of the tube corresponds to a fitting tolerance increased by an allowance for thermal expansion.

According to one advantageous variant embodiment, to decrease the response time of the temperature detection, the interior of the heated tube and/or the exterior of the cladding is treated, before the arrangement, so as to provide it (them) with a thermal emissivity at least equal to 0.8.

The treatment may advantageously consist either of controlled oxidation of the tube, preferably by heating in an oxidizing atmosphere, or of coating with a material having a high thermal emissivity, such as a black paint.

Lastly, one subject of the invention is the use of a rod thermometer according to the invention as described above, installed using the method described above, to detect the occurrence of a boiling crisis.

DETAILED DESCRIPTION

Other features and advantages of the invention will become more clearly apparent on reading the detailed description of example embodiments of the invention given by way of nonlimiting illustration and with reference to the appended figures, in which.

It will be noted here that electrical simulating devices of the direct heating type (FIGS. 1 and 3) and of the indirect heating type, as described and claimed in patent application FR 1 154 336, (FIG. 2) must allow the occurrence of a boiling crisis, defined as a substantial change in wall temperature for a small variation in thermo-hydraulic control parameters, to be detected.

Figure 1:
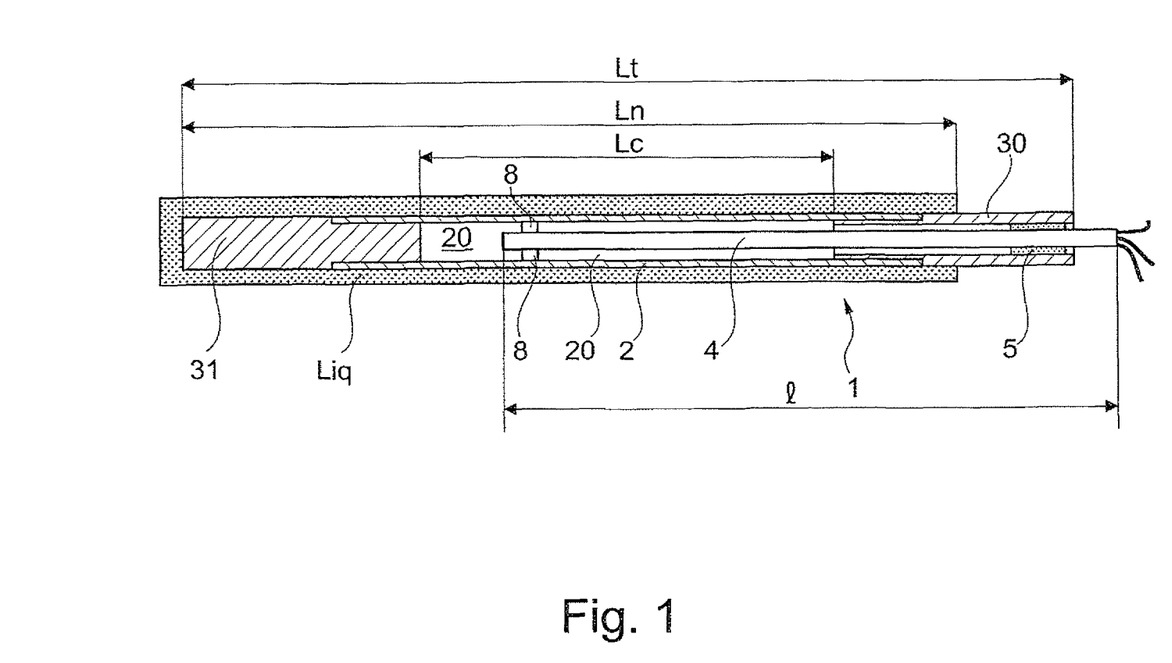
FIG. 1 is a schematic longitudinal cross-sectional view of a device for electrically simulating a nuclear fuel rod of the direct heating type, in which a rod thermometer according to the invention is installed.
Figure 2:
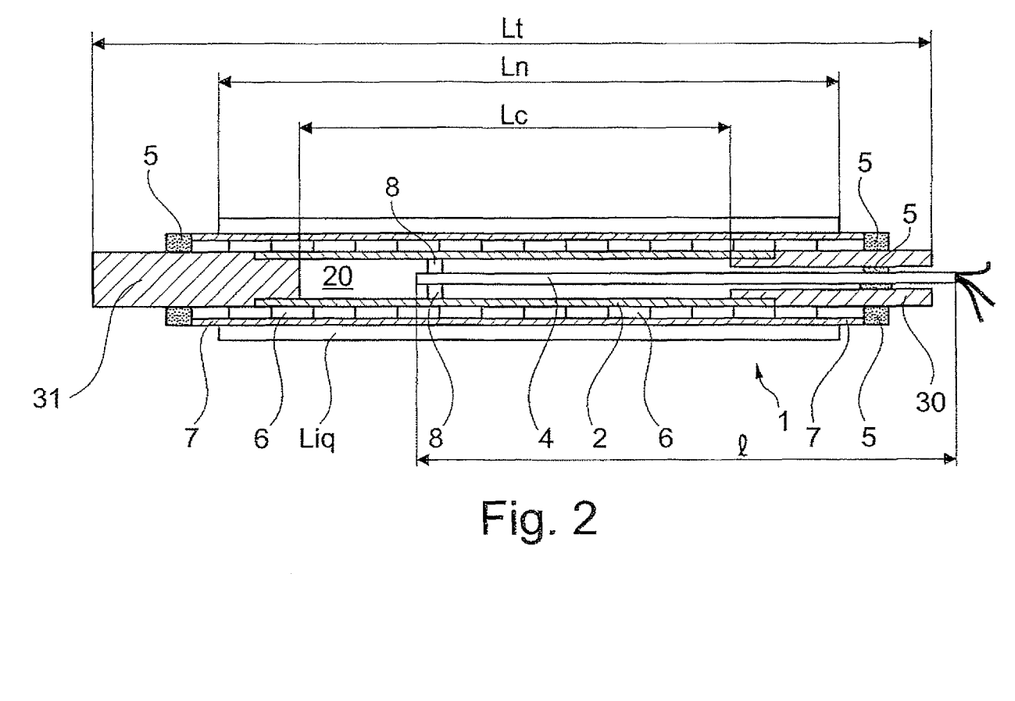
FIG. 2 is a schematic longitudinal cross-sectional view of a device for electrically simulating a nuclear fuel rod of the indirect heating type, in which a rod thermometer according to the invention is installed.
Figure 3:
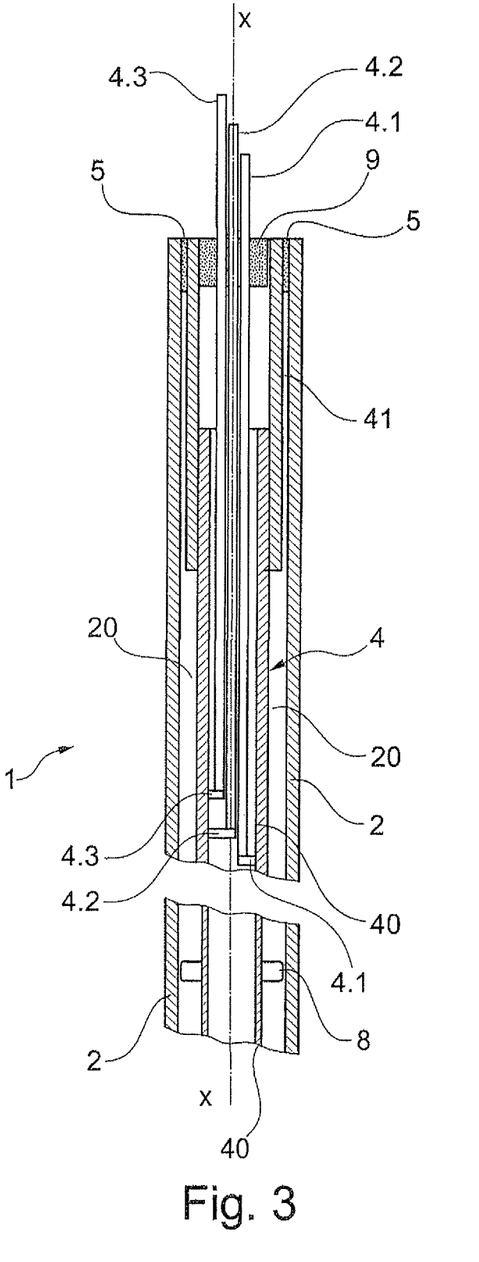
FIG. 3 is a schematic view showing in detail the rod thermometer according to the invention such as it is when installed in the direct heating electrical simulating device shown in FIG. 1.

It will also be noted that in all of FIGS. 1 to 3, the references Lt, Ln and Lc and l respectively designate:
  Lt: overall length of the electrical simulating device;
  Ln: length of the device submerged in the liquid;
  Lc: heated length of the device; and
  l: overall length of the rod thermometer.

It should be noted that in the design of direct heating electrical simulating devices (FIGS. 1 and 3) provision is made for an electrical connection to be submerged in the liquid to be heated (Liq), whereas an indirect heating electrical simulating device (FIG. 2) is designed so that there is no submerged electrical connection, this being advantageous because there is then no need to provide for sophisticated electrical insulation from the exterior environment.

It will also be noted that to carry out boiling crisis tests, an electrical simulating device in which a rod thermometer according to the invention is installed is arranged within a assembly (not shown) of a plurality of identical devices with spacer grids inside a tank (not shown) containing the liquid to be heated, the two electrical connections protruding from the tank while being insulated therefrom by suitable means, and the tubular resistor is supplied with DC current. For pressurized water reactors, the liquid to be heated is water. For other applications, the liquid to be heated may be different. Typically for sodium-cooled fast breeder reactors (Na-FBR), the liquid to be heated is sodium.

For these boiling crisis tests the following parameters are fixed for each electrical simulating device:
  heated length Lc, typically from 1 to 4.3 meters;
  the axial heat flux density profile per rod, typically from 0.2 to 3.5 $MW/m^2$;
  exterior cladding outside diameter typically from 8.5 to 10.7 mm; and
  total electrical supply, typically 250 V with a maximum local gradient equal to 100 V/m.

Likewise, for these tests, the following parameters are fixed for the assembly together of a plurality of electrical simulating devices:
  the type and the positions of the spacer grids, defining the type and the pitch of the cells of an assembly; and
  the number of devices per assembly, which must be small, typically from 19 to 37.

The internal operating conditions of the electrical simulating device as follows:
  internal operating temperature in the steady-state: 450° C.;
  internal operating temperature during a boiling crisis: 800° C.; and
  internal neutral-gas pressure: 180 bars.

For the sake of clarity, analogous elements of direct and indirect heating devices have been given the same references.

FIG. 1 shows an electrical simulating device that is conventionally referred to as a direct heating device. The device 1 consists of a resistor 2 taking the form of a tube that also serves as an external cladding. In other words, the tubular cladding 2 also plays the role of an electrical resistor, i.e. the part supplied with current in order to heat the liquid in which the device is submerged. The interior 20 of the tubular resistor/cladding 2 is filled with pressurized nitrogen. Two electrical connections 30, 31 are each inserted into one of the ends of the resistor/cladding 2. One of the connections 30 is that which supplies the current: it is drilled through its center in order to house the rod thermometer 4 according to the invention of longitudinal axis X, which extends longitudinally along the axis of the device in the interior of the heated cladding 2 through the space occupied by the pressurized insulating gas 20, as will be detailed below.

In this end, the seal tightness of the heated cladding 2 to the pressurized nitrogen in the interior 20 thereof is ensured both by the connection 30 itself and by an end plug 5 made of an electrically insulating material. The other 31 of the connections is that through which the current leaves: it is unapertured and therefore also serves as a sealing plug.

FIG. 2 shows an indirect heating electrical simulating device 1 such as described and claimed in patent application FR 1 154 336. It essentially consists of:
- a tubular resistor 2 of the same type as that of the direct heating device 1 shown in FIG. 1, in order to obtain a high heat flux density having an axial profile dependent only on the variation in the thickness of the resistor, and a uniform, i.e. azimuthally invariant, transverse profile;
- the radial dimensions of the tubular resistor are smaller in order to electrically insulate it using an added electrically insulating but thermally conductive intermediate element 6 that preferably has a very high thermal conduction coefficient;
- an external cladding 7 of a thermally conductive material that encases the tubular resistor 2/intermediate element 6 assembly, the outside diameter of said cladding being the fixed diameter indicated above (8.5 to 10.7 mm), i.e. that of the claddings of nuclear fuel rods intended for PWR reactors; and
- a rod thermometer 4 according to the invention installed in the interior of the resistor 2 in the space occupied by the pressurized insulating gas 20.

Furthermore, the tubular resistor 2 is supplied with DC current via the connection 30. For applications other than the qualification of nuclear fuel, the electrical supply may be a single-phase AC supply.

In the embodiment in FIG. 2 the electrically insulating and thermally conductive intermediate element is a column of ceramic pellets 6 drilled through their center, stacked one on top of the other and inserted around the tubular resistor 2 over its entire length and around a portion of the electrical connections 30, 31.

In the electrical simulating devices 1 described above, given the fixed internal operating conditions and parameters, during a boiling crisis in which the exchange coefficient drops to a very low value, the temperature of the heated element wall 2 in FIG. 1 and of the external cladding wall 7 in FIG. 2 increases by 1750 K/s with an uncertainty of 300 K.

The electrical power supply of the heated element 2 must be cut with a characteristic fall time shorter than 170 ms, thereby, on account of the properties of the power supply control unit, leaving about 100 ms for the characteristic detection time.

Up to now, in the prior art, the temperature detecting devices used to detect boiling crises in electrical simulating devices consisted of thermocouples, for example eight K-type thermocouples made of inconel 600, each arranged making contact with the heated element 2 in FIG. 1 or the exterior cladding 7 in FIG. 2 in various axial and azimuthal positions in locations specified with a tolerance of +/−2 mm. In a direct heating device 1 analogous to that shown in FIG. 1, the thermocouples were welded directly to the heated cladding 2. In an indirect heating device 1 analogous to that described in patent application FR 1 154 336 and shown in FIG. 2, provision was made to insert the thermocouples into grooves produced in the exterior of the external cladding 7.

The locations specified for the arrangement with direct contact of the thermocouples according to the prior art corresponded to zones in which a boiling crisis was expected to occur.

With such a detection method according to the prior art, the number of temperature detection points was thus limited, typically to about ten per device 1, essentially because of the relatively high cost in terms of investment and in terms of the man-hours required for installation.

Furthermore, once the tests had been carried out, on the one hand the actual thermocouples, and on the other hand the heated element 2 in FIG. 1 or the external cladding 7 in FIG. 2, were rendered unusable.

To alleviate these drawbacks, the inventors of the present invention had the idea of producing a rod thermometer 4 such as shown in FIG. 3.

The rod 4 according to the invention comprises a protective cladding 40 made of a metal constituting one of the two metals of a thermocouple.

A plurality of wires 4.1, 4.2, 4.3 made of a metal different from that of the cladding and constituting the other of the two metals of a thermocouple is housed in the interior of the protective cladding 40.

One of the ends of each of the wires 4.1, 4.2, 4.3 is welded to the interior of the cladding so as to form a measurement junction of a given thermocouple, the welded ends of the wires being distributed in a plurality of axial and azimuthal positions relative to the axis X in the interior of the cladding, each of the wires exiting from the cladding via at least one of its ends.

Thus, one end of one wire 4.1, 4.2, 4.3 is welded in each axial and azimuthal position that must be monitored for the purposes of detecting a boiling crisis.

Preferably, the metal of the protective cladding 40 and that of the wires 4.1, 4.2, 4.3 form K-type thermocouples.

The metal wires 4.1, 4.2, 4.3 are preferably covered with an electrically insulating coating in order to insulate them from each other and from the protective cladding 40 (apart from the junctions)

As shown in FIG. 3, the protective cladding is preferably made up of two portions 40, 41, the larger-diameter top portion being brazed around the bottom portion. The top portion 41 thus forms an adapter and makes it easier to fit the connection 30.

To produce the rod thermometer 4 according to the invention, it is advantageously possible to proceed in the following way:
- cutting longitudinally along two opposite generatrices a tube 40 made of a metal constituting one of the two metals of a thermocouple, so as to form two half tubes;
- welding one end of each of the plurality of wires 4.1, 4.2, 4.3 made of a metal constituting one of the two metals of a thermocouple to the interior of at least one half tube, the ends of the welded wires being distributed in a plurality of axial and azimuthal positions (FIG. 3); and
- joining the two half tubes to make the metal tube forming the protective cladding by welding along each generatrix while leaving the plurality of metal wires to exit via at least one of its ends. The welding of one of the ends of the wires 4.1, 4.2, 4.3 to at least one half tube is achieved by arc welding and the reconstituting welding is spot welding.

Provision may be made to braze or weld a seal-tight end fitting to the bottom portion of the reconstituted metal tube 40.

In order to fit the rod thermometer in the interior either of the external heated cladding 2 (direct heating device 1 in FIG. 1) or of the internal resistor 2 (indirect heating device 1 in FIG. 2), the protective cladding 40 forming the common metal of the thermocouples is arranged in the interior of and at a distance from this heated tube 2, the space between the cladding and the heated tube is filled with a pressurized insulating gas 20 and the space filled with pressurized insulating gas 20 is sealed by means of one or more electrically insulating elements 5. To create the seal level with an electrically insulating element 5, such element possibly being a ceramic shim, a metal/ceramic/metal brace may advantageously be produced on the one hand with the adapter-tube 41 and on the other hand with the tube 2. Moreover, in order to ensure the rod thermometer 4 is held mechanically in the tube 2, it is possible to form a mechanical metal/metal joint between the adapter-tube 41 and the tube 2 under the electrically insulating shim 5.

To avoid the risk of short-circuits, the protective cladding 40 is equipped with spacers or shims 8 made of an electrically insulating material, such as a ceramic, in zones outside of the measurement junctions. These shims 8 fastened to the exterior of the protective cladding 40 are dimensioned in order to be fitted so that there is play with the interior of the heated tube 2. The play between the shims 8 and the interior of the tube corresponds to a fitting tolerance increased by an allowance for thermal expansion.

To improve the response time of the measurement instrumentation, the emissivity of the internal face of the heated tube 2 may be increased so as to be higher than a value of 0.8. Likewise, the emissivity of the external face of the protective cladding may be increased to a value higher than 0.8.

In the top portion 41 of the rod thermometer according to the invention a seal 9 may be formed between the metal wires 4.1, 4.2, 4.3 and the cladding 41 that also allows said wires to be held in position.

By way of example, the dimensions and materials of complete devices 1 and of the rod thermometer 4 according to the invention are given below.

Dimensions:
complete device 1:
    Submerged length Ln: 1.2 to 4.5 m;
    Total length Lt: 1.5 to 4.8 m;
external cladding 2 or 7:
    Outside diameter: 8.5 to 10.7 mm;
    Thickness: ~1 mm with a value of 0.5 mm for a peak power flux equal to 3.5 MW/m$^2$;
resistor 2:
    Heated length Lc: 1 to 4.3 m;
    Outside diameter smaller by about 0.5 mm to the inside diameter of the external cladding 7;
    Inside diameter dependent on the electrical resistance in question;
ceramic pellets 6:
    Thickness: about 2 mm;
shims 8:
    Outside diameter 4.9 mm;
    Inside diameter: 4 mm;
    Height: 10 mm;
rod thermometer 4 according to the invention:
    Overall length l: 1 to 3 m;
    Outside diameter: 4 mm;
protective cladding 40:
    Thickness: 0.1 mm;
    metal wires 4.1, 4.2, 4.3 . . .
    Diameter: 0.1 mm.
Materials:
    external cladding 7: Inconel 600 or 316 L stainless steel;
    resistor 2: Inconel 600 or 70/30 cupronickel;
    stacked pellets 6 made of boron nitride or aluminum nitride and ceramic coating 22 made of zirconia;
    electrical connections 30, 31: copper, nickel or molybdenum;
    sealing element 5: ceramic shim brazed on the one hand to the tube 2 and on the other hand to the adapter-tube 41;
    electrically insulating sealing elements 9: resin or silicone;
    shims 8: alumina or zirconia;
    rod thermometer 4 according to the invention:
        protective cladding 40: chromel or Inconel® 600;
        wires 4.1, 4.2, 4.3: alumel covered with alumina.

With the dimensions and materials indicated for the rod thermometer 4 according to the invention, the thermal inertia of the latter is a relatively low, thereby leading to a relatively short response time. Typically, for an increase in the temperature of the cladding 2 of 1000° C./s, a set detection threshold higher than 10° C. is reached by the rod thermometer 4 in less than 100 ms for a cladding temperature 2 below 750° C.

Although described exclusively with regard to a device for electrically simulating a nuclear fuel rod for carrying out boiling crisis tests, the device according to the invention described above with reference to FIGS. 2 and 3 may also be used more generally in detection of the temperature of a wall for which a high measurement density is required in the axial and azimuthal directions.

The invention claimed is:
1. A device for detecting temperature, forming a rod thermometer, comprising:
    a plurality of elements sensitive to temperature; and
    a protective cladding of longitudinal axis X in which the sensitive elements are partially housed,
    characterized in that the protective cladding is made of a metal constituting one of the two metals of a thermocouple, and in that the sensitive elements consist in a plurality of wires made of a metal different from that of the cladding and constituting the other of the two metals of a thermocouple, one of the ends of each of the wires being welded to the interior of the cladding so as to form a measurement junction of a given thermocouple, the welded ends of the wires being distributed in a plurality of axial and azimuthal positions relative to the axis X in the interior of the cladding, each of the wires exiting from the cladding via at least one of its ends.

2. The rod thermometer as claimed in claim 1, wherein the metal of the cladding is a type-K material.

3. The rod thermometer as claimed in claim 1, wherein the metal of the wires is a type-K material.

4. The rod thermometer as claimed in claim 2, wherein the cladding is either made of chromel or of a nickel/chromium alloy, and the wires are made of alumel.

5. The rod thermometer as claimed in claim 1, wherein the wires are entirely covered with an electrical insulator except for their junction ends.

6. The rod thermometer as claimed in claim 5, wherein the wires made of alumel are covered with an alumina deposit.

7. The rod thermometer as claimed in claim 1, wherein a thickness of the protective cladding is smaller than or equal to 0.1 mm.

8. The rod thermometer as claimed in claim 1, wherein an outside diameter of the wires is smaller than or equal to 0.1 mm.

9. The rod thermometer as claimed in claim 1, comprising at least one adapter-tube made from the same metal as the cladding and of larger outside diameter than that of the cladding, the adapter tube being brazed around the cladding at the end where the metal wires exit.

10. A process for manufacturing the rod thermometer as claimed in claim 1, comprising the following steps:
    cutting longitudinally along two opposite generatrices a tube made of a metal constituting one of the two metals of a thermocouple, so as to form two half tubes;
    welding one end of each of the plurality of wires made of a metal constituting one of the two metals of a thermocouple to the interior of at least one half tube, the ends of the welded wires being distributed in a plurality of axial and azimuthal positions; and
    joining the two half tubes to make the metal tube forming the protective cladding by welding along each generatrix while leaving the plurality of metal wires to exit via at least one of its ends.

11. The manufacturing process as claimed in claim 10, wherein the welding of one of the ends of the wires to one half tube is achieved by arc welding.

12. The manufacturing process as claimed in claim 10, wherein the welding joining the two half tubes is spot welding.

13. A method for installing the temperature detecting device according to claim 1 in a device for simulating electrically a nuclear fuel rod comprising at least one tube made of an electrically conductive material, referred to as the heated tube, that is intended to heat a liquid, in order to detect the occurrence of a boiling crisis in the liquid, in which:
    the cladding forming the common metal of the thermocouples is arranged in the interior of the electrical simulating device and at a distance from the heated tube, the space between the cladding and the heated tube is filled with a pressurized insulating gas and the space filled with pressurized insulating gas is sealed.

14. The installing method as claimed in claim 13, in which the arrangement at distance is achieved by means of spacers made of an electrically insulating material that are fastened to the exterior of the cladding housing the welded wires and fitted so that there is clearance with the interior of the heated tube, in zones devoid of wires.

15. The installing method as claimed in claim 13, in which, before the arrangement, the interior of the heated tube and/or the exterior of the cladding is treated so as to provide it/them with a thermal emissivity at least equal to 0.8.

16. The installing method as claimed in claim 15, in which the treatment consists either of controlled oxidation of the tube or of coating with a material having a high thermal emissivity.

* * * * *